(12) United States Patent
McCullough et al.

(10) Patent No.: US 12,152,553 B2
(45) Date of Patent: Nov. 26, 2024

(54) ANNULAR AEROSPIKE NOZZLE WITH WIDELY-SPACED THRUST CHAMBERS, ENGINE INCLUDING THE ANNULAR AEROSPIKE NOZZLE, AND VEHICLE INCLUDING THE ENGINE

(71) Applicant: STOKE Space Technologies, Inc., Kent, WA (US)

(72) Inventors: Thomas Ryan McCullough, Seattle, WA (US); Thomas Feldman, Kent, WA (US); Andrew Lapsa, Kent, WA (US); Zachary Sander, Maple Valley, WA (US)

(*) Notice: Subject to any disclaimer, the term of this patent is extended or adjusted under 35 U.S.C. 154(b) by 0 days.

(21) Appl. No.: 18/554,650

(22) PCT Filed: Apr. 13, 2022

(86) PCT No.: PCT/US2022/071688
§ 371 (c)(1),
(2) Date: Oct. 10, 2023

(87) PCT Pub. No.: WO2022/251763
PCT Pub. Date: Dec. 1, 2022

(65) Prior Publication Data
US 2024/0200511 A1 Jun. 20, 2024

Related U.S. Application Data

(60) Provisional application No. 63/236,002, filed on Aug. 23, 2021, provisional application No. 63/174,323, filed on Apr. 13, 2021.

(51) Int. Cl.
*F02K 9/97* (2006.01)
*B64G 1/40* (2006.01)
(Continued)

(52) U.S. Cl.
CPC ............... *F02K 9/97* (2013.01); *B64G 1/401* (2013.01); *B64G 1/58* (2013.01); *F02K 9/88* (2013.01);
(Continued)

(58) Field of Classification Search
CPC .. F02K 9/97; F02K 9/88; B64G 1/401; B64G 1/58; B64G 1/006; B64G 1/002;
(Continued)

(56) References Cited

U.S. PATENT DOCUMENTS 3,093,346 A 6/1963 Faget et al.
3,270,501 A 9/1966 Webb
(Continued)

FOREIGN PATENT DOCUMENTS

CN 102828851 A 12/2012

OTHER PUBLICATIONS

International Search Report and Written Opinion, issued in corresponding International App. No. PCT/US22/07688, mailed Dec. 13, 2022, 6 pages.
(Continued)

*Primary Examiner* — Valentina Xavier
(74) *Attorney, Agent, or Firm* — Patrick D. Duplessis (57) ABSTRACT

An annular aerospike nozzle for a vehicle, such as an upper stage rocket, is disclosed. The annular aerospike nozzle includes a centerbody and a plurality of thrust chambers spaced around the centerbody. Each thrust chamber has a throat and a nozzle portion extending aft of the throat. The nozzle portion has an exit dimension $D_{exit}$ at an aft end. Each thrust chamber is spaced away from adjacent thrust chambers by a spacing distance $D_{space}$, such that $D_{space} \geq M^* D_{exit}$, where $M \geq 1$.

17 Claims, 9 Drawing Sheets

(51) Int. Cl.
- B64G 1/58 (2006.01)
- F02K 9/88 (2006.01)
- B64G 1/00 (2006.01)

(52) U.S. Cl.
CPC .......... *B64G 1/006* (2023.08); *F05D 2220/80* (2013.01); *F05D 2240/15* (2013.01); *F05D 2250/73* (2013.01)

(58) Field of Classification Search
CPC ... B64G 1/62; F05D 2220/80; F05D 2240/15; F05D 2250/73; F05D 2250/31
See application file for complete search history.

(56) References Cited

U.S. PATENT DOCUMENTS

| | | | |
|---|---|---|---|
| 3,780,968 A | 12/1973 | Parilla | |
| 3,888,419 A | 6/1975 | McCullough | |
| 3,929,289 A | 12/1975 | Kardon et al. | |
| 5,201,832 A | 4/1993 | Porter | |
| 6,059,235 A | 5/2000 | Meissinger et al. | |
| 6,213,431 B1 | 4/2001 | Janeke | |
| 6,516,605 B1 | 2/2003 | Meholic | |
| 6,964,154 B1 | 11/2005 | Sackheim et al. | |
| 7,431,242 B1 | 10/2008 | Brown et al. | |
| 10,773,834 B2 | 9/2020 | Mbamalu | |
| 2005/0017132 A1 | 1/2005 | Janeke | |
| 2005/0188677 A1 | 9/2005 | Nyberg et al. | |
| 2006/0145020 A1 | 7/2006 | Buehler | |
| 2006/0219846 A1 | 10/2006 | Johnson et al. | |
| 2007/0012820 A1 | 1/2007 | Buehler | |
| 2007/0163227 A1* | 7/2007 | Mano ................ | F02K 9/978 60/200.1 |
| 2009/0145134 A1* | 6/2009 | Vuillamy ............ | F02K 9/97 60/770 |
| 2012/0312927 A1 | 12/2012 | Morris et al. | |
| 2017/0138310 A1 | 5/2017 | Villarreal et al. | |
| 2019/0003423 A1 | 1/2019 | Pelfrey | |
| 2019/0009933 A1 | 1/2019 | Mbamalu | |
| 2020/0049103 A1 | 2/2020 | Craddock et al. | |

OTHER PUBLICATIONS

International Search Report and Written Opinion, issued in related International App. No. PCT/US22/07686, mailed Nov. 21, 2022, 7 pages.
Christopher J. Cohan, Walter B. Olstad, Donald W. Patterson, and Robert Salkeld, Space Transportation Systems 1980-2000, Publisher: American Institute of Aeronautics and Astronautics (Jan. 1, 1978), 91 pages, ISBN 0-915928-27-2.
Wang, Ten-See. "Analysis of Linear Aerospike Plume-Induced X-33 Base-Heating Environment." Journal of Spacecraft and Rockets 36 (1998): 777-783.
Campbell, J., Jr. and Cobb, S. M., Aerospike Thrust Chamber Program—Final Report, Rockwell International Corp. Canoga Park, CA, United States, Published Dec. 1, 1976, Report/Patent No. NASA-CR-135169/R76-189, Accession No. 77N21189: Funding Number(s): Contract_Grant: NAS3-20076, 154 pages.
Advanced Aerodynamic Spike Configurations, Technical Report, Rocketdyne Canoga Park CA Canoga Park , Silver,Roy, Nov. 1, 1966 Accession No. AD0378296, 411 pages.
Bono, P., "The Case for Ballistic Recovery of Boosters," SAE Technical Paper 670382, 1967, https://doi.org/10.4271/670382, 17 pages.
G. Esnault and F. Rossi, "Design and CFD Analysis of the LOX/LCH4 Dual Regenerative Cooling Circuit of the DEMOP1 Demonstrator," Pangea Aerospace, Calle Roc Boronat, 117, 08018 Barcelona, Spain.
Hefner, J.N., & Keyes, J.W. (1967). Effect of forward-facing jets on aerodynamic characteristics of blunt configurations at Mach 6. Journal of Spacecraft and Rockets, 4, 533-534.
Simmons, J. R. (2014). Design and Evaluation of Dual-Expander Aerospike nozzle Upper Stage Engine.
NASA Technology Roadmaps, TA 9: Entry, Descent, and Landing Systems, Jul. 2015, 125 pages.
The M-1 Rocket Engine, Technical Report, Aeroject-General Corporation under Contract NAS 3-2555, 29 pages.
Charczenko, N., Hennessey, K. W., & United States. (1961). Investigation of a retrorocket exhausting from the nose of a blunt body into a supersonic free stream. Washington, D.C: National Aeronautics and Space Administration.
Romeo, D. J., Sterrett, J. R., United States., & Langley Research Center. (1963). Exploratory investigation of the effect of a forward-facing jet on the bow shock of a blunt body in a Mach No. 6 free stream. Washington, D.C: National Aeronautics and Space Administration.
Hall, Joshua N., "Optimized Dual Expander Aerospike Rocket" (2011). Theses and Dissertations. 1326. https://scholar.afit.edu/etd/1326.
Berman, K. and Crimp, F.W., Jr. Performance of Plug-Type Rocket Exhaust Nozzles, ARS Journal, Jan. 1961, pp. 18-23.
Onofri, M., Calabro, M.J., Hagemann, G.S., Immich, H., Sacher, P.W., Nasuti, F., & Reijasse, P. (2006). Plug Nozzles: Summary of Flow Features and Engine Performance.
Rao, G.V. (1961). Recent Developments in Rocket Nozzle Configurations. ARS Journal, 31, 1488-1494.
Aukerman, C.A. (1991). Plug nozzles: The ultimate customer driven propulsion system.
Rogers A (2023) Spacecraft Recycling: Unveiling the Potential of Reusable Rocket Technology. Adv Automob Eng. 12:225.
Scarborough, R. (1964). Recovery and Reuse of a Two Stage Launch Vehicle.
Danielson, T. (2017). Vehicle Integrated Aerospike for High Mass Mars Missions.
Korzun, A.M. (2008). Supersonic Retropropulsion Technology for Application to High Mass Mars Entry , Descent , and Landing.

\* cited by examiner

ANNULAR AEROSPIKE NOZZLE WITH WIDELY-SPACED THRUST CHAMBERS, ENGINE INCLUDING THE ANNULAR AEROSPIKE NOZZLE, AND VEHICLE INCLUDING THE ENGINE

CROSS-REFERENCE TO RELATED APPLICATIONS

This application is the National Stage Entry of International Patent Application No. PCT/US22/71688, filed Apr. 13, 2022, which claims priority to U.S. Provisional Patent Application No. 63/236,002, filed on Aug. 23, 2021, and U.S. Provisional Patent Application No. 63/174,323, filed on Apr. 13, 2021, the contents of which are incorporated by reference herein in their entirety.

TECHNICAL FIELD

The present disclosure generally relates to propulsion systems having exhaust nozzles. The present disclosure more particularly relates to an annular aerospike nozzle with widely-spaced thrust chambers, a non-axisymmetric heat shield at least partially defined by the annular aerospike nozzle, an engine including the annular aerospike nozzle, and a vehicle including the engine.

BACKGROUND

Aircraft-like reusability for rockets has long been the "holy grail" of rocketry due to the potential for large cost benefits. The ability to recover and reuse an upper stage rocket of a multi-stage rocket system (e.g., the second stage rocket of a two-stage rocket system) remains a significant technical gap that has not yet been solved by the industry. Reusing the upper stage of a multi-stage rocket is challenging due to the harsh re-entry environment and the performance penalties associated with increased structural mass required for withstanding the reentry environment and guiding the vehicle to a precise landing location. Upper stage rockets are typically constructed with the minimum structure and complexity since any mass addition to the second stage is a 1:1 reduction in payload capacity. Reusing an upper stage rocket therefore requires significant additional functionality but with minimal mass addition.

Rockets and other vehicles that travel at or above hypersonic speeds (e.g., space re-entry vehicles, aircraft, missiles, etc.) within a planetary atmosphere require a means to protect themselves from the heating that occurs at such high speeds. Conventional solutions for mitigating such heating include use of one or more of the following: (i) ablative materials, which undergo pyrolysis and generate gases that move downstream in a boundary layer to form a protective film layer; (ii) high-temperature materials (e.g., ceramics, carbon-carbon, etc.); (iii) composite materials, which insulate a base material and radiate heat away therefrom; and (iv) transpiration cooling, which involves use of a thin protective film that is provided by a gas passing through a semi-porous wall. These conventional solutions for mitigating heating have detrimental cost, operations, and mass impacts for certain applications, such as reusable vehicles. It is therefore advantageous to minimize the vehicle area and associated mass which must be protected with such a heat shield.

To reduce the operations cost and turnaround time of a reusable space re-entry vehicle, it is advantageous to control the vehicle to land at a precise location that is configured to limit the damage to the vehicle during the landing event (e.g., a prepared concrete surface or landing zone).

Achieving controlled landing requires the ability to maneuver during atmospheric re-entry and counteract trajectory disturbances during flight. The very large nozzle engines (e.g., bell nozzle engines) that are traditionally used for upper stage rockets have limitations that prevent their use as propulsive landing systems for upper stage rockets. In particular, large nozzle engines are typically optimized for efficiency only in a vacuum, and therefore experience relatively poor performance during atmospheric operation (i.e., during re-entry and landing). Moreover, large nozzle engines are difficult to protect during re-entry because they are very thin and incur severe flow separation and side loads in the atmosphere. Adding a secondary propulsion system to an upper stage rocket to allow for controlled landing is unfeasible due to detrimental cost and mass impacts.

Figure 1:
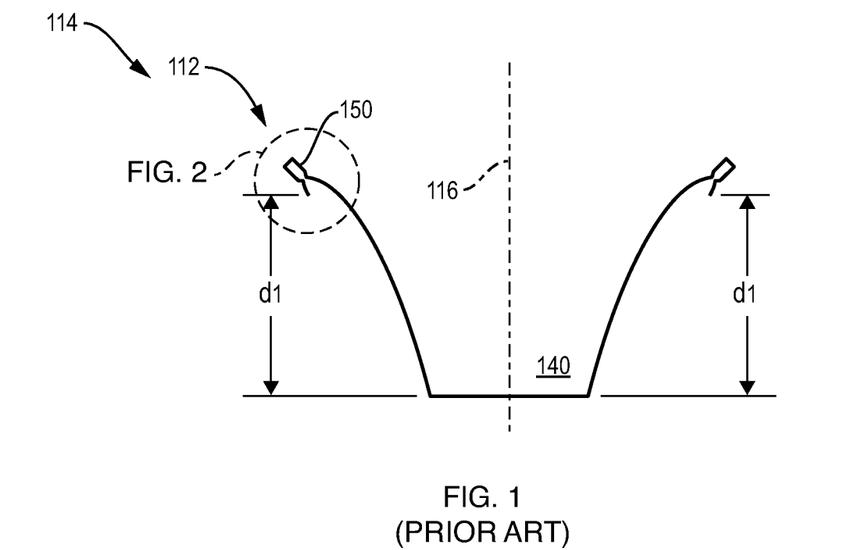
FIG. 1 schematically illustrates a prior art aerospike engine and nozzle.
Figure 2:
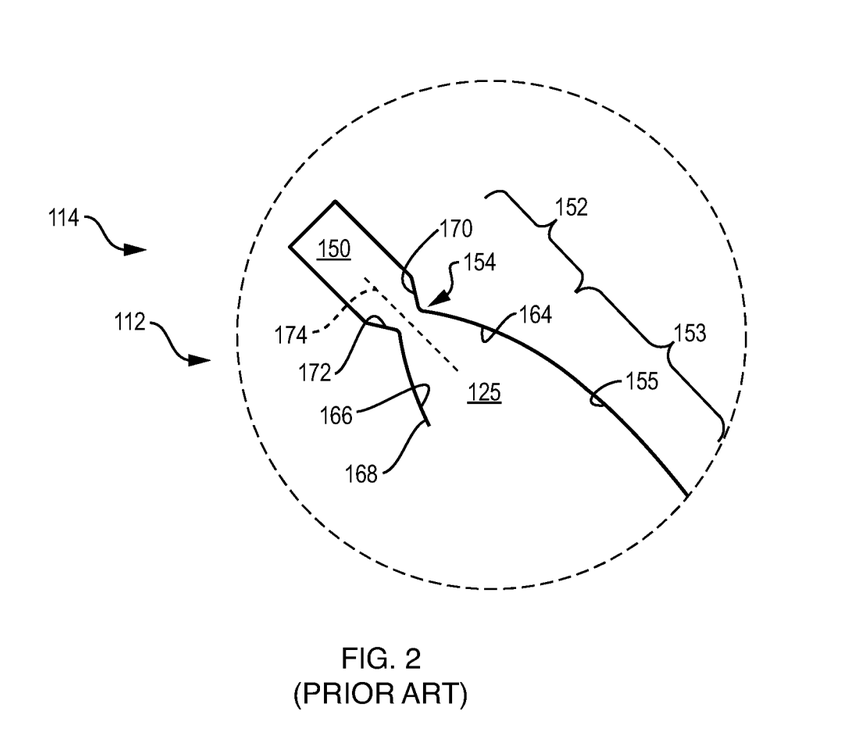
FIG. 2 schematically illustrates a portion of the prior art aerospike engine and nozzle of FIG. 1.

Applicant's recent efforts to overcome these and other problems have focused on use of an aerospike nozzle engine. The aerospike nozzle engine minimizes the nozzle efficiency loss due to pressure drag, which allows it to operate inside the atmosphere at a low throttle level, whereas flow separation would occur in large nozzle engines, resulting in unsteady thrust oscillations, unsteady thrust vectoring, and engine or vehicle damage. Referring to FIG. 1, a prior art aerospike engine 114 includes at least one high pressure chamber 150 (e.g., a combustion chamber) and an aerospike nozzle 112. Referring to FIG. 2, the prior art aerospike nozzle 112 includes at least one initial nozzle portion 152 through which exhaust gas initially exits the high pressure chamber 150, and a secondary nozzle portion 153 downstream relative to the initial nozzle portion 152. The initial nozzle portion 152 includes at least one throat 154 and is typically in the form of a converging-diverging nozzle. The secondary nozzle portion 153 includes a centerbody 140 (e.g., the aerospike) (see FIG. 1) defining an inner expansion surface 155. The prior art aerospike engine 114 and improvements thereto are discussed in more detail in the commonly-assigned U.S. Provisional Patent Application No. 62/941,386, filed Nov. 27, 2019, and in the International Patent Application No. PCT/US2020/048178, filed Aug. 27, 2020 and claiming priority to U.S. Provisional Patent Application No. 62/941,386, the contents of which are incorporated herein by reference in their entirety.

Referring to FIG. 2, in the illustrated embodiment of the prior art aerospike engine 114, the throat 154 defines a transition between an upstream converging section with opposing converging surfaces 170, 172, and a downstream diverging section with opposing diverging surfaces 164, 166. The diverging surfaces 164, 166 define an initial nozzle cavity 125 therebetween. The inner diverging surface 164 is contiguous with (e.g., at least substantially flush with) the inner expansion surface 155 defined by the centerbody 140 of the secondary nozzle portion 153. The outer aft end 168 of the initial nozzle portion 152 is defined by the aft end of the wall defining the outer diverging surface 166. In prior art embodiments like the one shown in FIG. 2, the initial nozzle portion 152 is sometimes referred to as a "primary nozzle."

In some embodiments of the prior art aerospike engine 114, including those shown in FIGS. 1-2, the engine 114 has a so-called "plug cluster" configuration. In these configurations, the engine 114 includes a plurality of discrete high pressure chambers 150 spaced relative to one another and a plurality of discrete initial nozzle portions 152 spaced relative to one another. Each initial nozzle portion 152 is disposed relative to a corresponding high pressure chamber 150, and is configured to exhaust gas exiting the respective high pressure chamber 150. Each high pressure chamber 150 and initial nozzle portion 152 pair is known in the art as a "thrust can" or "thrust chamber." The initial nozzle portion 152 of each thrust chamber includes a discrete throat 154 that extends annularly about an axis 174 of the initial nozzle portion 152. In such prior art embodiments, the converging surfaces 170, 172 of the throat 154 form a continuous surface that extends annularly about the axis 174, and the diverging surfaces 164, 166 of the throat 154 form a continuous surface that extends annularly about the axis 174. In some instances, the converging surfaces 170, 172 and/or the diverging surfaces 164, 166 are axisymmetric relative to the axis 174. In a toroidal (e.g., annular) aerospike configuration, such as that shown in FIG. 1, the thrust chambers are circumferentially spaced about the centerline 116 of the vehicle on which the engine 114 is disposed.

With respect to "plug cluster" configurations, the prior art teaches positioning each thrust chamber (i.e., each discrete high pressure chamber 150 and its corresponding initial nozzle portion 152) as close as possible to circumferentially-adjacent thrust chambers in order to achieve optimal thrust performance and flow separation, and to minimize efficiency losses.

In addition to maneuverability, a vehicle must also have sufficient aerodynamic lift capability in order to slow down during atmospheric re-entry and achieve a controlled landing. Prior art re-entry vehicles that achieved precision landing were typically lifting bodies, such as the Space Shuttle. These vehicles achieved large lift-to-drag ratios and substantial maneuvering capability, but came with the expense of a large heat shield area and several actively controlled aerodynamic surfaces on the underside of the winged vehicle. Other prior art re-entry vehicles minimized the additional mass of the heat shield by exposing only a relatively small base area of the vehicle to the re-entry environment. These re-entry vehicles generated lift-to-drag ratios sufficient to slow them down during atmospheric re-entry and achieve a somewhat controlled landing, but they lacked a propulsion system or other means for maneuvering and were thus unable to land at precise locations.

Figure 3:
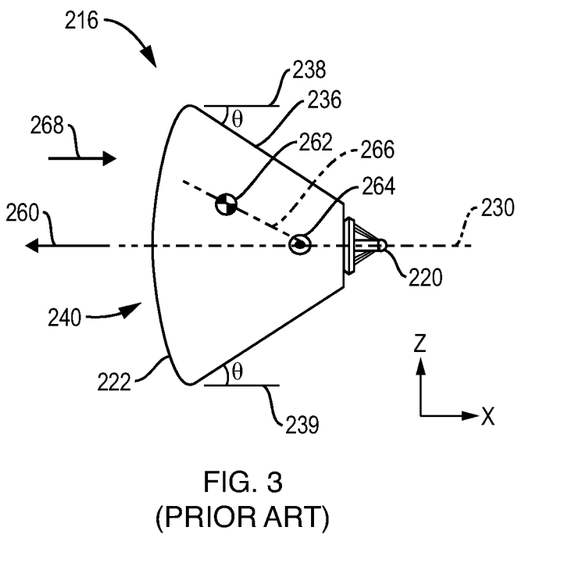
FIG. 3 schematically illustrates a prior art vehicle (i.e., the re-entry vehicle of the Apollo spacecraft) with an axisymmetric heat shield in a zero angle of attack orientation.
Figure 4:
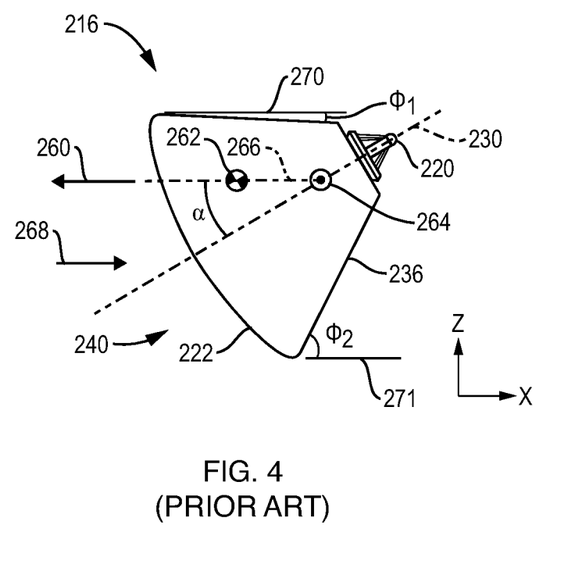
FIG. 4 schematically illustrates the prior art vehicle of FIG. 3 in a non-zero angle of attack orientation.

One such prior art vehicle is the re-entry vehicle 216 of the Apollo spacecraft, which is schematically illustrated in FIGS. 3 and 4. This prior art vehicle 216 was in the form of a capsule that extended along a linear centerline 230 between a forward end 220 and an opposing aft end 222 thereof. The aft end 222 defined the windward side of the vehicle 216 during atmospheric re-entry. The prior art vehicle 216 included a heat shield 240 defining a heat shield outer surface on the windward side, and an annular sidewall 236 disposed at an angle θ (hereinafter the "sidewall angle θ") of thirty-three degrees (33°) relative to planes 238, 239 parallel to the centerline 230. The heat shield surface 240 and the vehicle 216 as a whole were at least substantially axisymmetric relative to the centerline 230. Referring to FIG. 3, the prior art vehicle 216 would initially re-enter the atmosphere at a so-called zero angle of attack, in which the vehicle 216 was oriented such that the centerline 230 was parallel to the direction of travel 260. In the zero angle of attack orientation, the center of gravity 262 and the center of pressure 264 of the vehicle 216 were in a plane 266 offset relative to the direction of travel 260.

During flight, the aerodynamic lift and drag forces on the vehicle 216 would have generated pitching moments about the center of gravity 262, and the vehicle 216 would have naturally adopted an orientation at which those moments were balanced, which is known as the aerodynamic trim point. In this orientation, shown in FIG. 4, the center of gravity 262 and the center of pressure 264 of the vehicle 216 would have been in a plane 266 parallel to the direction of travel 260. In this orientation, opposing sides of the vehicle 216 would have been disposed at different respective angles φ1, φ2 relative to planes 270, 271 parallel to the direction of travel 260. The center of gravity 262 and the center of pressure 264 of the prior art vehicle 216 would have been selected to achieve a particular non-zero angle of attack during atmospheric re-entry. This is because increasing the angle of attack increases the lift-to-drag ratio of the vehicle 216. To achieve a sufficiently high lift-to-drag ratio while also avoiding potentially catastrophic exposure of the sidewall 236 to the high enthalpy flow 268 moving relative to the vehicle 216 in a direction opposite the direction of travel 260, the prior art vehicle 216 had to be designed with a relatively steep sidewall angle θ (i.e., the sidewall angle θ has a relatively high magnitude).

The magnitude of the sidewall angle θ is inversely related to the volume of the vehicle 216, and thus a design with a steep sidewall angle θ may be undesirable for some applications. If the purpose of a vehicle 216 is to deliver cargo, for example, then a steeper sidewall angle θ means less volume for storing cargo.

Aspects of the present invention are directed to these and other problems.

SUMMARY

According to an aspect of the present invention, an annular aerospike nozzle for a vehicle, for example an upper stage rocket, includes a centerbody and a plurality of thrust chambers spaced around the centerbody. Each thrust chamber has a throat and a nozzle portion extending aft of the throat, the nozzle portion having an exit dimension $D_{exit}$ at an aft end thereof. Each thrust chamber is spaced away from adjacent thrust chambers by a spacing distance $D_{space}$, such that $D_{space} \geq M^*D_{exit}$, where $M \geq 1$.

According to another aspect of the present invention, an engine includes a centerbody and a plurality of thrust chambers spaced around the centerbody. Each thrust chamber has a high pressure chamber that generates a gas for thrust, a nozzle portion that extends aft of the high pressure chamber and exhausts the gas generated by the high pressure chamber, and a throat connecting the high pressure chamber to the nozzle portion. The nozzle portion of each thrust chamber has an exit dimension $D_{exit}$ at an aft end thereof. Each thrust chamber is spaced away from adjacent thrust chambers by a spacing distance $D_{space}$, such that $D_{space} \geq M^*D_{exit}$, where $M \geq 1$.

According to another aspect of the present invention, a vehicle includes an engine including a centerbody and a plurality of thrust chambers spaced around the centerbody. Each thrust chamber has a high pressure chamber that generates a gas for thrust, a nozzle portion that extends aft of the high pressure chamber and exhausts the gas generated by the high pressure chamber, and a throat connecting the high pressure chamber to the nozzle portion. The nozzle portion of each thrust chamber has an exit dimension $D_{exit}$ at an aft end thereof. Each thrust chamber is spaced away from adjacent thrust chambers by a spacing distance $D_{space}$, such that $D_{space} \geq M^*D_{exit}$, where $M \geq 1$.

According to another aspect of the present invention, a heat shield for protecting a windward side of a vehicle from a high enthalpy flow includes a centerbody sidewall and a centerbody base extending aft of the centerbody sidewall. The centerbody sidewall and the centerbody base define a heat shield outer surface that is non-axisymmetric.

According to another aspect of the present invention, an aerospike nozzle includes a throat and a centerbody extending aft of the throat. The centerbody includes a centerbody sidewall defining an expansion surface, and a centerbody base extending aft of the centerbody sidewall. The centerbody sidewall and the centerbody base define a heat shield outer surface that is non-axisymmetric.

According to another aspect of the present invention, an engine includes a high pressure chamber and an aerospike nozzle that exhausts gas generated by the high pressure chamber. The aerospike nozzle includes a throat and a centerbody extending aft of the throat. The centerbody includes a centerbody sidewall defining an expansion surface, and a centerbody base extending aft of the centerbody sidewall. The centerbody sidewall and the centerbody base define a heat shield outer surface that is non-axisymmetric.

According to another aspect of the present invention, a vehicle includes an engine including a high pressure chamber, and an aerospike nozzle that exhausts gas generated by the high pressure chamber. The aerospike nozzle includes a throat and a centerbody extending aft of the throat. The centerbody includes a centerbody sidewall defining an expansion surface, and a centerbody base extending aft of the centerbody sidewall. The centerbody sidewall and the centerbody base define a heat shield outer surface that is non-axisymmetric.

According to another aspect of the present invention, a re-usable upper stage rocket of a multi-stage rocket system includes a re-entry heat shield surface on the base of the upper stage rocket. The re-entry heat shield surface has a non-axisymmetric shape which generates lift at a zero angle of attack.

In addition to, or as an alternative to, one or more of the features described above, further aspects of the present invention can include one or more of the following features, individually or in combination:

the centerbody sidewall and the centerbody base collectively form a blunt body;
the centerbody sidewall includes a rigid wall with a cone shape;
the centerbody sidewall has a truncated and oblique cone shape;
the centerbody base has at least one of a semi-spherical shape, a frustoconical shape, a multi-conic shape, and an ellipsoidal shape;
at least one of the centerbody sidewall and the centerbody base is actively cooled;
the centerbody is a truncated toroidal aerospike;
the vehicle is an upper stage rocket;
the vehicle is an atmospheric re-entry vehicle;
the centerbody is a truncated toroidal aerospike and the centerbody base partially defines an aft end of the vehicle;
the vehicle includes a main body portion defining a forward end of the vehicle and a base portion defining an aft end of the vehicle, and the main body portion is at least substantially axisymmetric relative to a main body centerline extending in a direction between a forward end of the main body portion and an aft end of the main body portion;
the heat shield outer surface is non-axisymmetric relative to the main body centerline;
the heat shield outer surface is configured such that net aerodynamic forces acting on the centerbody during atmospheric re-entry are at an angle relative to the main body centerline;
the heat shield outer surface is configured such that net aerodynamic forces acting on the centerbody generate lift during atmospheric re-entry at a zero angle of attack;
the engine and the aerospike nozzle are configured such that the aerospike nozzle exhausts gas generated by the high pressure chamber in a direction toward the aft end of the vehicle;
the centerbody sidewall and the centerbody base are components of the heat shield;
the centerbody has a circular contour, and the plurality of thrust chambers are spaced around the circular contour of the centerbody;
the spacing distance $D_{space}$ is defined as an arc length between adjacent thrust chambers;
the spacing distance $D_{space}$ is defined as a chord length between adjacent thrust chambers;
the thrust chambers are uniformly spaced around the centerbody;
the exit dimension $D_{exit}$ of the nozzle portion of each thrust chamber is a diameter;
a thruster mount is positioned at an aft end of a main body of the vehicle, the thruster mount having a plurality of openings extending therethrough in a direction parallel to a centerline of the main body of the vehicle, and each opening is configured to receive one of the thrust chambers;
the centerbody is non-axisymmetric relative to the centerline of the main body of the vehicle;
the centerbody and the thruster mount define at least a portion of a heat shield;
the centerbody has a circular contour, and the plurality of thrust chambers are spaced around the circular contour of the centerbody;
the spacing distance $D_{space}$ is defined as an arc length between adjacent thrust chambers;
the spacing distance $D_{space}$ is defined as a chord length between adjacent thrust chambers;
the thrust chambers are uniformly spaced around the centerbody; and
the exit dimension $D_{exit}$ of the nozzle portion of each thrust chamber is a diameter.

These and other aspects of the present invention will become apparent in light of the drawings and detailed description provided below.

DETAILED DESCRIPTION

Referring to FIGS. 6-9, the present disclosure describes a non-axisymmetric heat shield 10, a nozzle 12 defined by at least a portion of the heat shield 10, an engine 14 including the nozzle 12, and a vehicle 16 including the engine 14.

Figure 5:
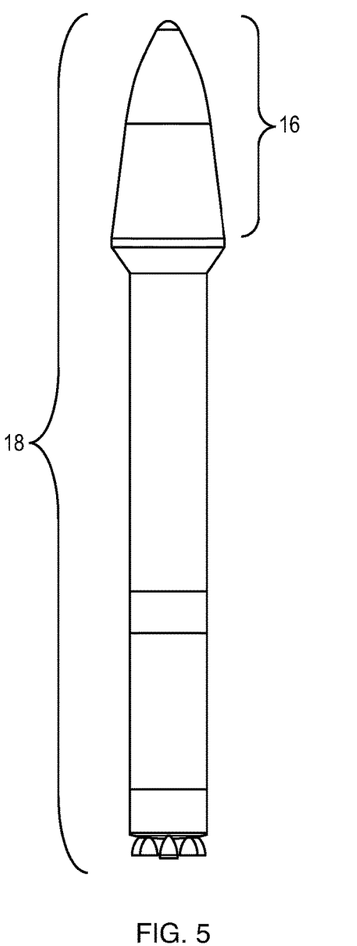
FIG. 5 is an elevation view of a two-stage rocket system including an upper stage rocket with the present non-axisymmetric heat shield.
Figure 6:
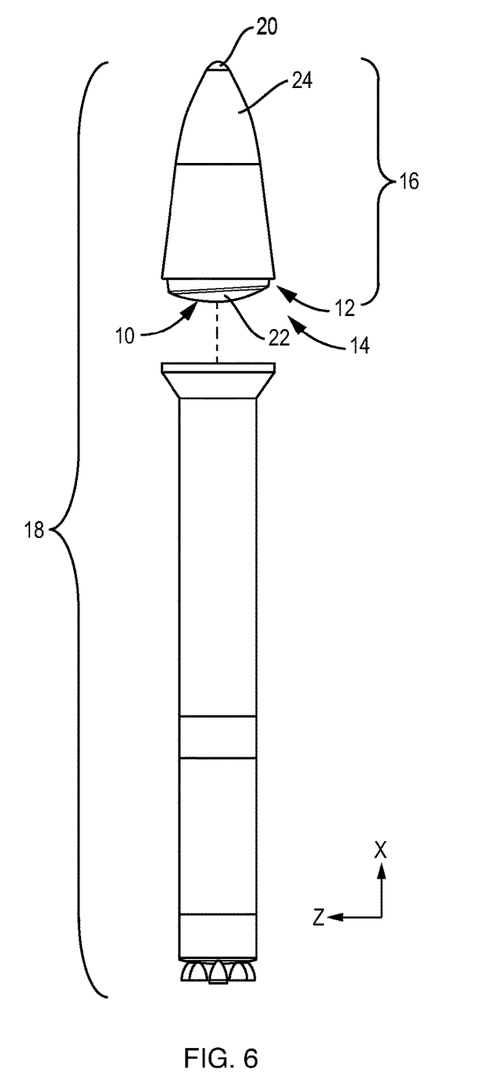
FIG. 6 is an exploded elevation view of the two-stage rocket system of FIG. 5.
Figure 7:
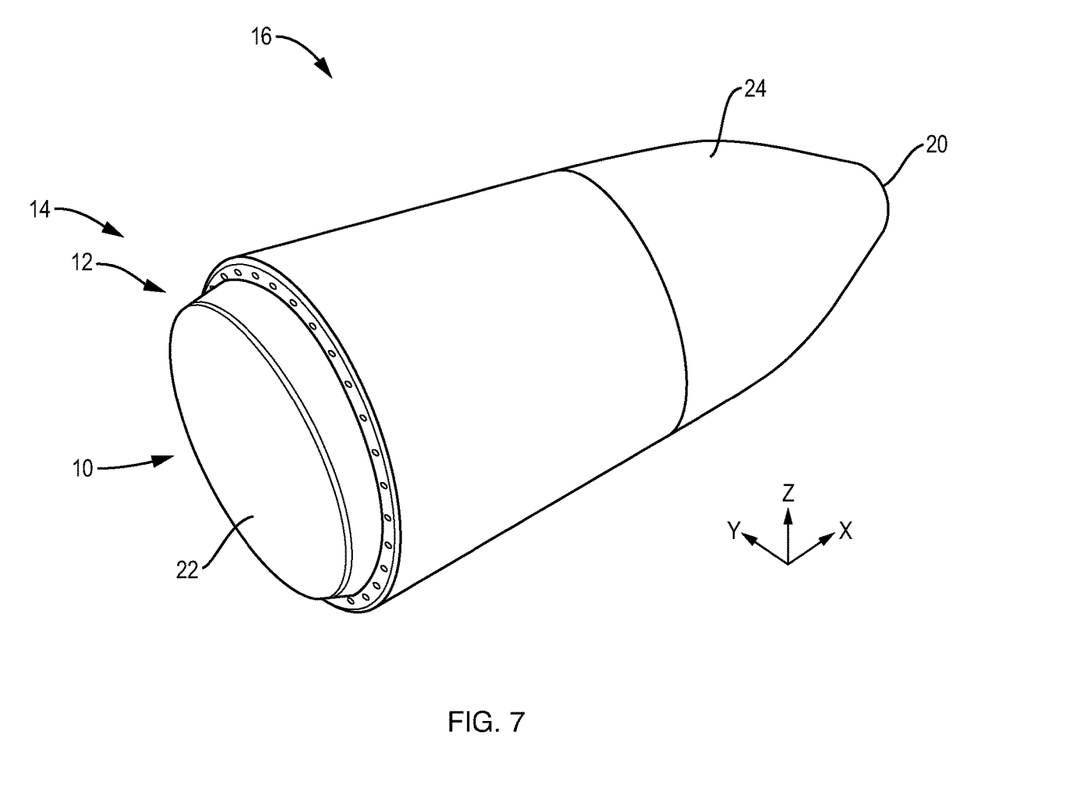
FIG. 7 is a perspective view of the upper stage rocket of FIG. 5.

The vehicle 16 is a rocket (e.g., a multi-stage rocket, a single-stage-to-orbit (SSTO) rocket, an upper stage rocket, a booster rocket, etc.), a missile, a spacecraft, an aircraft, or another vehicle designed for travel (e.g., flight) up to at least supersonic speeds (e.g., supersonic speeds, hypersonic speeds, re-entry speeds, etc.) in atmospheric, sub-orbital, orbital, extraterrestrial, and/or outer space environments. Referring to FIG. 5, in the illustrated embodiment, the vehicle 16 is a reusable second stage rocket of a two-stage rocket system 18. Referring to FIGS. 6 and 7, the vehicle 16 extends between a forward end 20 and an opposing aft end 22. The vehicle 16 includes a payload housing 24 proximate the forward end 20, and an engine 14 proximate the aft end 22. The aft end 22 defines the windward side of the vehicle 16 during atmospheric re-entry, for example.

Figure 8:
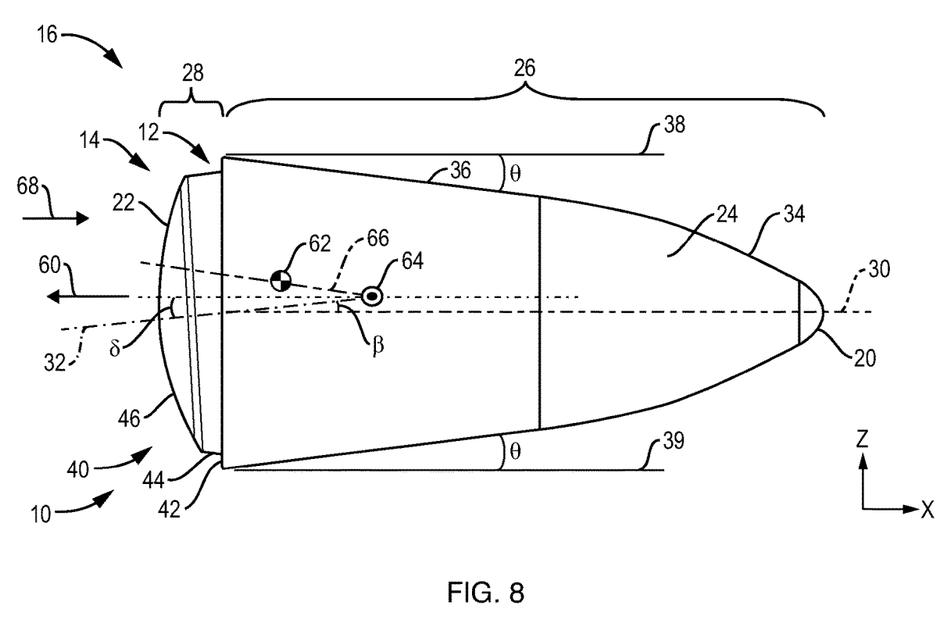
FIG. 8 is an elevation view of the upper stage rocket of FIG. 5 in a zero angle of attack orientation.
Figure 9:
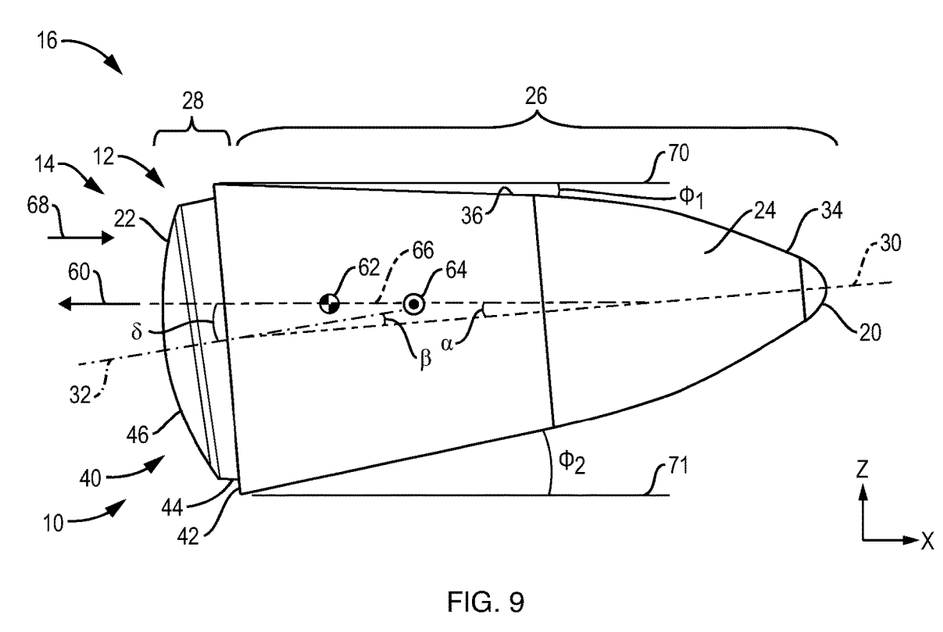
FIG. 9 is an elevation view of the upper stage rocket of FIG. 5 in a non-zero angle of attack orientation.

Referring to FIGS. 8 and 9, the vehicle 16 includes a main body portion 26 defining the forward end 20 of the vehicle 16, and a base portion 28 defining the aft end 22 of the vehicle 16. The main body portion 26 is shaped such that the outer surface thereof is at least substantially axisymmetric relative to a main body centerline 30 (e.g., a linear centerline perpendicular to the tangent of the forwardmost point of the main body portion 26) extending in a direction between a forward end of the main body portion 26 (i.e., the forward end 20 of the vehicle 16) and an aft end of the main body portion 26. The base portion 28 includes a heat shield 10 defining a heat shield outer surface, which is on the windward side of the vehicle 16 during atmospheric re-entry, for example. The heat shield 10 is configured such that heat shield outer surface is non-axisymmetric relative to the main body centerline 30, and is non-axisymmetric relative to a heat shield centerline 32 (e.g., a linear centerline perpendicular to the tangent of the aftmost point of the heat shield 10) extending in a direction between a forward end of the heat shield 10 and an aft end of the heat shield 10 (e.g., the aft end 22 of the vehicle 16). The main body portion 26 and the heat shield 10 of the vehicle 16 are therefore configured such that the heat shield centerline 32 is offset relative to the main body centerline 30 by an angle $\beta$. The angle $\beta$ is typically within the range of 1° to 10°. In the illustrated embodiment, the angle $\beta$ is 4°. In other embodiments, the angle $\beta$ is approximately 1°, 2°, 3°, 5°, 6°, 7°, 8°, 9°, or 10°, for example. In some embodiments, including the illustrated embodiment, at least one portion of the heat shield outer surface is at least substantially axisymmetric relative to the heat shield centerline 32, as will be discussed in more detail below.

Referring still to FIGS. 8 and 9, the main body portion 26 of the vehicle 16 includes a nose 34 and a sidewall 36 extending aft of the nose 34. In the illustrated embodiment, the nose 34 includes a rigid wall with a rounded cone shape, and the sidewall 36 includes a rigid wall with a frustoconical shape. The sidewall 36 at least partially defines a payload housing 24 in which a payload (e.g., cargo, munitions, etc.) is stored during transport by the vehicle 16. The sidewall 36 further surrounds one or more internal components of the vehicle 16, such as one or more components of the engine 14 and/or one or more components of a system for actively cooling the heat shield 10 (e.g., a tank, a pump, a turbine, etc.). The sidewall 36 is disposed at an angle $\theta$ (hereinafter the "sidewall angle $\theta$") relative to planes 38, 39 parallel to the main body centerline 30. In the illustrated embodiment, the vehicle 16 is designed with a relatively shallow sidewall angle $\theta$ (i.e., the sidewall angle $\theta$ has a low high magnitude) in comparison to the prior art vehicle 216 of FIGS. 3 and 4. The sidewall angle $\theta$ is within the range of 0° to 90°. In some embodiments, the sidewall angle $\theta$ is within the range of 5° to 15°. In the illustrated embodiment, for example, the sidewall angle $\theta$ is 7°. The magnitude of the sidewall angle $\theta$ is inversely related to the volume of the vehicle 16, and thus the shallow sidewall angle $\theta$ advantageously allows the vehicle 16, and in particular the payload housing 24, to have a larger volume than that of the prior art vehicle 216.

Figure 10:
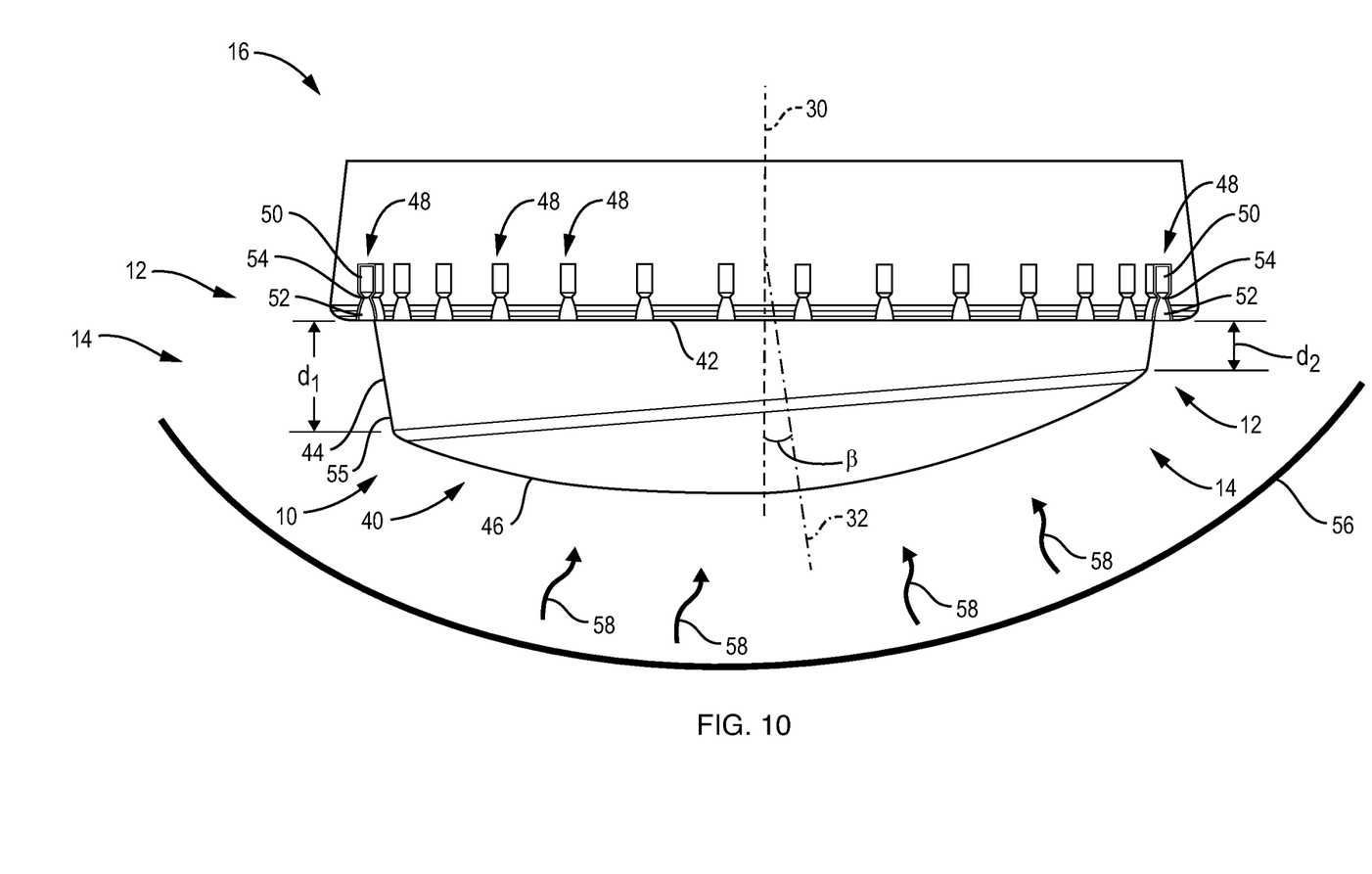
FIG. 10 is an elevation view of the aft end of the upper stage rocket of FIG. 5.
Figure 11:
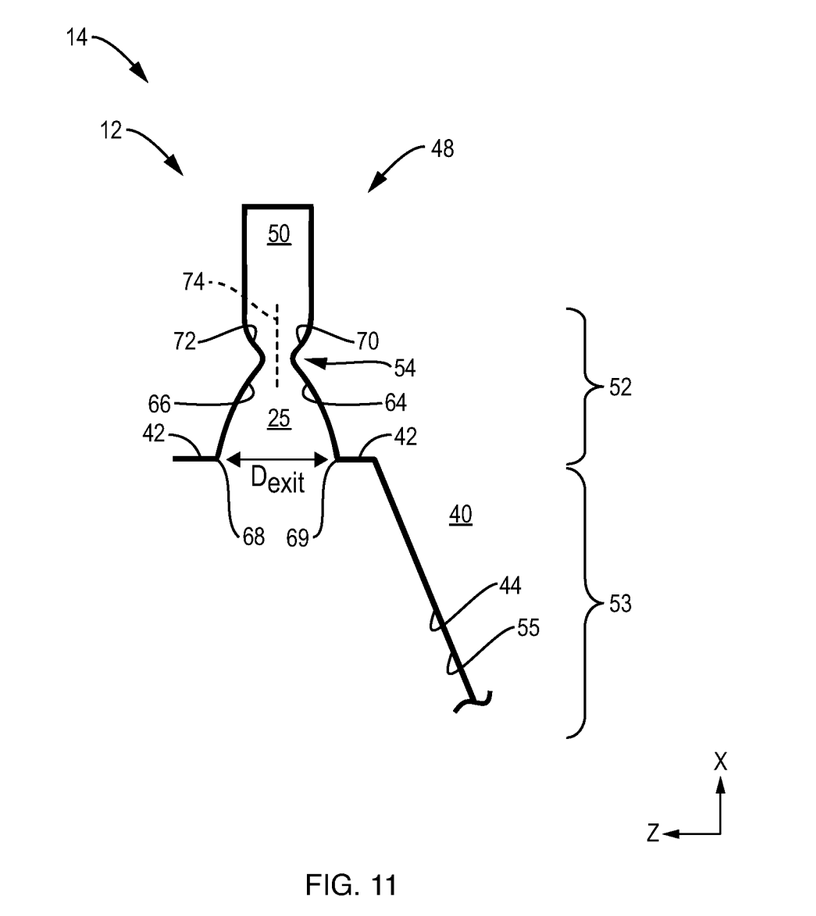
FIG. 11 schematically illustrates a portion of the aerospike engine and nozzle of the upper stage rocket of FIG. 5.

Referring to FIGS. 8-10, the base portion 28 of the vehicle 16 includes one or more components that define the heat shield 10 and the outer surface thereof (i.e., the heat shield outer surface). In the illustrated embodiment, the base portion 28 includes a centerbody 40 and a thruster mount 42, which each define portions of the heat shield 10 and the heat shield outer surface. The centerbody 40 is in the form of a truncated toroidal aerospike. The centerbody 40 includes a centerbody sidewall 44 and a centerbody base 46 that collectively form a blunt body. The centerbody sidewall 44 includes a rigid wall with a truncated and oblique cone shape. The centerbody base 46 includes a rigid wall with a semi-spherical shape. In other embodiments, the centerbody base 46 additionally or alternatively includes one or more rigid walls having a frustoconical shape, a multi-conic shape (e.g., bi-conic, tri-conic, etc.), an ellipsoidal shape, and/or another blunt shape. Referring to FIGS. 10 and 11, the thruster mount 42 includes a rigid wall extending annularly about the main body centerline 30, and positioned proximate the aft end of the main body portion 26 of the vehicle 16. The thruster mount 42 includes circumferentially-spaced openings 43 extending therethrough in a direction parallel to the main body centerline 30. Each opening 43 in the thruster mount 42 is configured to receive a thrust chamber 48 of the engine 14, which will be described in more detail below.

The heat shield outer surface defined by respective outer surfaces of the centerbody sidewall 44, the centerbody base 46, and the thruster mount 42 is non-axisymmetric relative to the main body centerline 30. In some embodiments, at least one portion of the heat shield outer surface is at least substantially axisymmetric relative to the heat shield centerline 32. In the illustrated embodiment, for example, the outer surface defined by the centerbody base 46 has a semi-spherical shape and is axisymmetric relative to the heat shield centerline 32.

In some embodiments, one or more components of the heat shield 10, including the centerbody sidewall 44, the centerbody base 46, and/or the thruster mount 42 are actively cooled using the heat shielding system disclosed in the commonly-assigned U.S. Provisional Patent Application No. 62/942,886, filed Dec. 3, 2019, and in the International Patent Application No. PCT/US2020/48226 filed Aug. 27, 2020 filed Aug. 27, 2020 and claiming priority to U.S. Provisional Patent Application No. 62/942,886, the contents of which are hereby incorporated by reference in their entirety. In some embodiments, at least a portion of the sidewall 36 of the main body portion 26 of the vehicle 16 is actively cooled in a same or similar manner.

Referring to FIGS. 10 and 11, the engine 14 includes at least one high pressure chamber 50 (e.g., a combustion chamber) and a nozzle 12.

The high pressure chamber 50 generates gas that is exhausted through the nozzle 12. The high pressure chamber 50 is in the form of an annular ring, a segmented ring, individual thrust chambers, or any other configuration providing supersonic flow to the nozzle 12.

The nozzle 12 is an aerospike nozzle having at least one initial nozzle portion 52 through which exhaust gas initially exits at least one high pressure chamber 50, and a secondary nozzle portion 53 (FIG. 11) downstream relative to the initial nozzle portion 52. The initial nozzle portion 52 includes at least one throat 54 and is typically in the form of a converging-diverging nozzle.

Referring still to FIGS. 10 and 11, the nozzle 12 is defined by at least a portion of the heat shield 10. In the illustrated embodiment, the secondary nozzle portion 53 (FIG. 11) of the nozzle 12 is defined by the centerbody 40. The centerbody sidewall 44 functions as an expansion surface 55 of the nozzle 12 in addition to its function as a portion of the heat shield 10. The centerbody sidewall 44 is non-axisymmetric relative to the heat shield centerline 32, and thus the nozzle 12 is non-axisymmetric relative to the heat shield centerline 32. As shown in FIG. 10, the initial nozzle portion 52 and the centerbody base 46 are separated by respective first and second distances $d_1$, $d_2$ on opposing sides of the vehicle 16. The first and second distances $d_1$, $d_2$ differ from one another due to the non-axisymmetric shape of the nozzle 12. This in contrast to the prior art aerospike nozzle 112 shown in FIG. 1, in which the initial nozzle portion 52 and the centerbody base 46 are separated by a same distance $d_1$ on opposing sides of the vehicle 16.

The engine 14 and the nozzle 12 can be configured in various different ways. In the illustrated embodiment, the engine 14 has a so-called "plug cluster" configuration. That is, the engine 14 includes a plurality of discrete high pressure chambers 50 spaced relative to one another and a plurality of discrete initial nozzle portions 52 spaced relative to one another.

Referring to FIGS. 10 and 11, in the "plug cluster" configuration of the illustrated embodiment, each initial nozzle portion 52 is disposed relative to a corresponding high pressure chamber 50, and is configured to exhaust gas exiting the respective high pressure chamber 50. Each high pressure chamber 50 and initial nozzle portion 52 pair is referred to hereinafter as a "thrust chamber 48." The secondary nozzle portion 53 is downstream relative to the thrust chambers 48.

Referring to FIG. 11, in the illustrated embodiment, the initial nozzle portion 52 of each thrust chamber 48 is in the form of a converging-diverging nozzle and/or a primary nozzle. In particular, the initial nozzle portion 52 of each thrust chamber 48 includes a throat 54 that defines a transition between an upstream converging section with opposing converging surfaces 70, 72, and a downstream diverging section with opposing diverging surfaces 64, 66. The throat 54 of each thrust chamber 48 extends annularly about an axis 74 of the initial nozzle portion 52. The diverging surfaces 64, 66 define an initial nozzle cavity 25 therebetween. The outer aft end 68 of the initial nozzle portion 52 is defined by the aft end of the wall defining the outer diverging surface 66. A radially inner portion of thruster mount 42 extends between the inner aft end 69 of the initial nozzle portion 52 and the centerbody sidewall 44 of the secondary nozzle portion 53. In other embodiments, the inner aft end 69 of the initial nozzle portion 52 meets the expansion surface 55 and an inflection point is defined therebetween.

Referring to FIG. 11, in the illustrated embodiment, each thrust chamber 48 is configured such that the axis 74 of the initial nozzle portion 52 is parallel to the main body centerline 30 (see FIG. 10). This is in contrast to the prior art aerospike nozzle 112 in FIGS. 1 and 2, for example, in which the axis 174 is angled (i.e., not parallel) relative to the centerline 116 of the vehicle on which the nozzle 112 is disposed. In other embodiments of the present engine 14 and nozzle 12, each thrust chamber 48 is configured such that the axis 74 of the initial nozzle portion 52 is angled (i.e., not parallel) relative to the main body centerline 30.

Referring still to FIG. 11, each thrust chamber 48 has an exit dimension $D_{exit}$. The exit dimension $D_{exit}$ is a maximum dimension of the initial nozzle cavity 25 in a direction perpendicular to the axis 74. In the illustrated embodiment, the diverging surfaces 64, 66 of the initial nozzle portion 52 define a circular cross-sectional shape in a plane perpendicular to the axis 74, and thus the exit dimension $D_{exit}$ corresponds to a diameter of the initial nozzle cavity 25 at the outer aft end 68 thereof. In the illustrated embodiment, the plurality of thrust chambers 48 are identical to one another, and thus the exit dimension $D_{exit}$ of each thrust chamber 48 has a same magnitude as that of every other thrust chamber 48.

Figure 12:
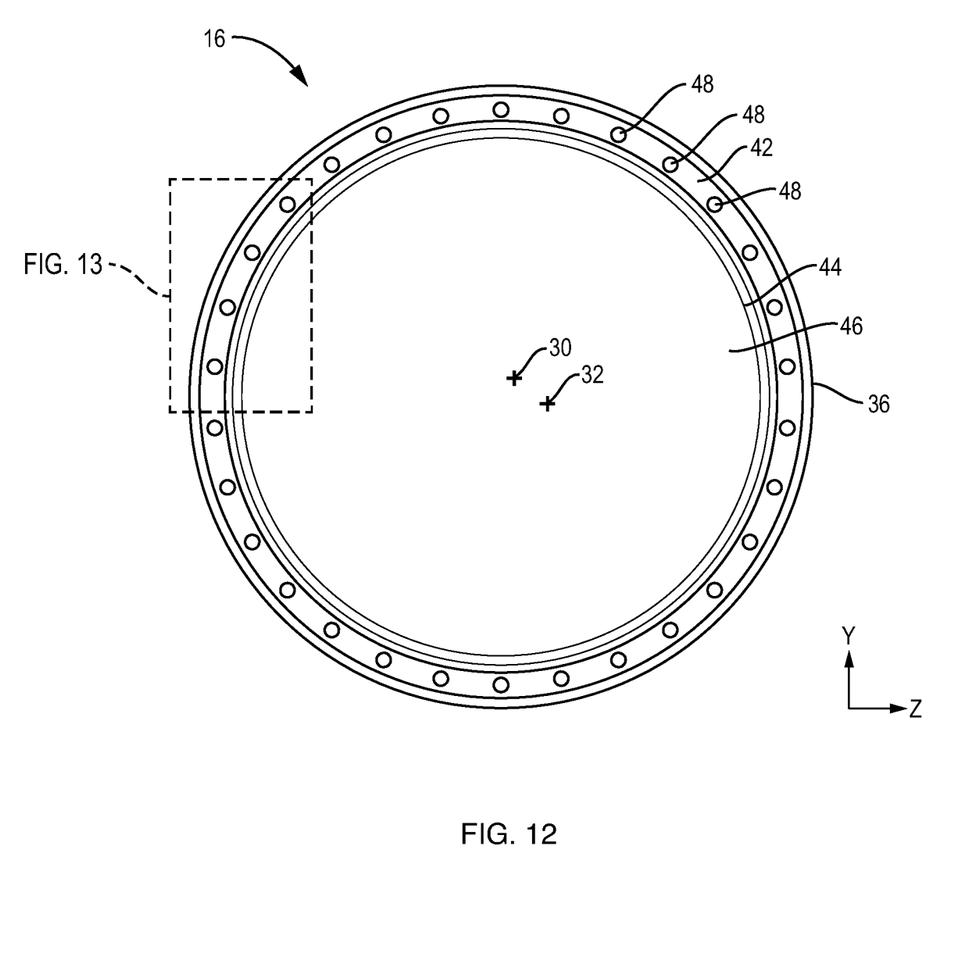
FIG. 12 is a plan view of the aft end of the upper stage rocket of FIG. 5.
Figure 13:
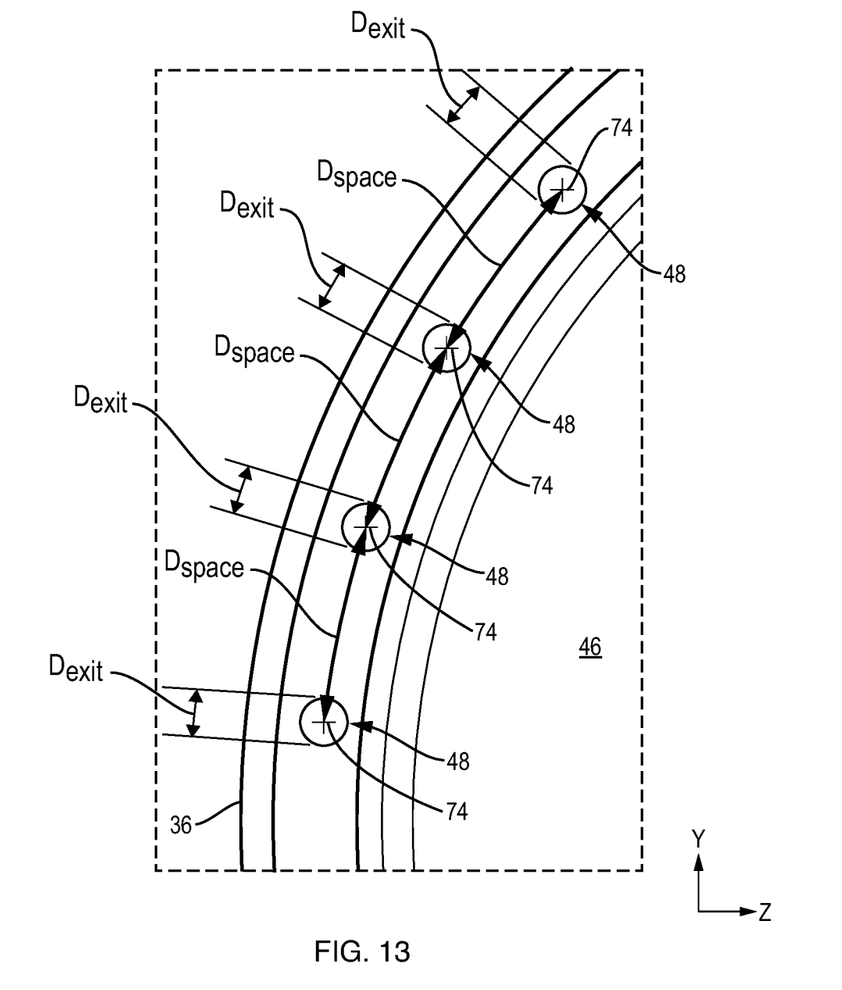
FIG. 13 is an enlarged portion of the plan view in FIG. 12.

Referring to FIGS. 12 and 13, in the illustrated embodiment, the thrust chambers 48 are circumferentially spaced relative to the main body centerline 30 such that each discrete thrust chamber 48 is separated from a circumferentially-adjacent thrust chamber 48 by a spacing distance $D_{space}$ that is greater than or equal to the product of the exit dimension $D_{exit}$ of the thrust chamber 48 and a multiplication factor M having a magnitude greater than or equal to one (1).

In the illustrated embodiment, the spacing distance $D_{space}$ is an arc length extending between the axis 74 of the initial nozzle portion 52 of a first thrust chamber 48 and the axis 74 of the initial nozzle portion 52 of a circumferentially-adjacent thrust chamber 48. In other embodiments, the spacing distance D is a chord length between the axis 74 of the initial nozzle portion 52 of a first thrust chamber 48 and the axis 74 of the initial nozzle portion 52 of a circumferentially-adjacent thrust chamber 48.

Referring still to FIGS. 12 and 13, in the illustrated embodiment, the multiplication factor M is approximately three (3) and the thrust chambers 48 are spaced uniformly around the centerbody 40 such that the spacing distance $D_{space}$ between a pair of circumferentially-adjacent thrust chambers 48 has a same magnitude as the respective spacing distances $D_{space}$ between every other pair of circumferentially-adjacent thrust chambers 48. In other embodiments, the thrust chambers 48 are spaced non-uniformly around the centerbody 40 such that the spacing distance $D_{space}$ between a pair of circumferentially-adjacent thrust chambers 48 has a different magnitude from the spacing distance $D_{space}$ between at least one other pair of circumferentially-adjacent thrust chambers 48. In other embodiments, the multiplication factor M has a magnitude greater than or equal to 2, 3, 4, 5, 6, 7, 8, 9, 10, etc. In some embodiments, the multiplication factor M has a magnitude within the range of at least of 1 to 2, 2 to 3, 3 to 4, 4 to 5, 5 to 6, 6 to 7, 7 to 8, 8 to 9, 9 to 10, etc. In some embodiments, the multiplication factor M is an integer. In other embodiments, the multiplication factor M is a non-integer. For example, in such embodiments, the multiplication factor M has a magnitude greater than or equal to 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, etc.

The magnitude of the multiplication factor M can vary based on one or more cost and/or performance factors, including, for example: a dimension and/or geometry of the engine 14, the nozzle 12, the vehicle 16, and/or a component thereof (e.g., a diameter of the vehicle 16, an exit dimension $D_{exit}$ of the thrust chamber 48, a desired nozzle expansion ratio, etc.); the total number of thrust chambers 48 included in the engine 14; a mass of the engine 14, the nozzle 12, the vehicle 16, and/or a component thereof; and/or a desired performance characteristic (e.g., thrust-to-weight ratio, thrust coefficient $C_F$, specific impulse $I_{sp}$, characteristic velocity c*, etc.).

The prior art teaches positioning thrust chambers as close as possible to circumferentially-adjacent thrust chambers, such that $D_{space}=M*D_{exit}$, where M is less than one (1). The conventional thought was that positioning thrust chambers very close to one another (e.g., M<<1) would better approximate the flow field of a non-clustered aerospike configuration and/or a traditional bell nozzle, and would thereby achieve optimal thrust performance and flow separation, and minimize efficiency losses. However, Applicant achieved unexpected results (e.g., improved thrust performance, minimized efficiency loss, etc.) when widely spacing thrust chambers 48 relative to one another such that $D_{space} \geq M*D_{exit}$, where M is greater than or equal to one (1). For example, Applicant achieved unexpected results in connection with the illustrated embodiment, in which the thrust chambers 48 are spaced relative to one another such that $D_{space}=M*D_{exit}$, where M is approximately three (3). Applicant discovered that, when the number of thrust chambers 48, the spacing distance $D_{space}$ between the thrust chambers 48, and the exit dimension $D_{exit}$ of the thrust chambers 48 are selected as design variables, the thrust coefficient $C_F$ can be optimized by widely spacing thrust chambers 48 relative to one another such that $D_{space} \geq M*D_{exit}$, where M is greater than or equal to one (1). The thrust T of the rocket engine 14 can be defined as $$T \equiv (\dot{m})(c^*)(C_F)$$

where $\dot{m}$ is the mass flow rate of propellant, c* is the characteristic velocity of the combustion gasses in the chamber 50 and is a measure of the energy generated by combustion, and $C_F$ is the nozzle thrust coefficient. The thrust coefficient determines the amplification of thrust due to gas expansion in the nozzle 12, and can be defined in terms of nozzle parameters using the equation $$C_F \equiv \eta_{C_F}\left[\sqrt{\left(\frac{2\gamma^2}{\gamma-1}\right)\left(\frac{2}{\gamma+1}\right)^{\frac{\gamma+1}{\gamma-1}}\left(1-\left(\frac{P_e}{P_o}\right)^{\frac{\gamma-1}{\gamma}}\right)}+\left(\frac{P_e}{P_o}-\frac{P_a}{P_o}\right)\frac{A_e}{A_t}\right]$$

where $\eta_{C_F}$ is the thrust coefficient efficiency, γ is the ratio of specific heats of the combustion gas, $P_o$ is the total stagnation pressure in the chamber 50, $P_e$ is the static pressure at the exit of the nozzle, $P_a$ is the ambient static pressure in the surrounding environment, and $A_e/A_t$ is the area ratio between the nozzle exit and the throat. Widely spacing thrust chambers 48 relative to one another can trade a reduction in efficiency $\eta_F$ in exchange for a more significant increase in area ratio $A_e/A_t$, resulting in an overall more optimal solution.

During operation, the vehicle 16 moves through an environment (e.g., the atmosphere, space) at freestream Mach numbers that can approach Mach thirty (30). During operation in vacuum conditions, exhaust plumes from the various thrust chambers 48 of the engine 14 merge to form an aerodynamic spike which traps a positive pressure along the centerbody base 46 of the heat shield 10. This generates additional thrust and improves the overall efficiency of the engine 14 and the vehicle 16. Referring to FIG. 10, during atmospheric flight, a bow shock 56 is formed upstream of the vehicle 16, and temperature on the vehicle side of the bow shock 56 can reach thousands of degrees Kelvin. The bow shock 56 generates significant drag to reduce the velocity of the vehicle 16, and also generates significant aerodynamic heating 58 on the heat shield 10, thereby necessitating cooling and/or other thermal protection for reusability, such as the above-mentioned active cooling system.

Referring again to FIG. 8, the vehicle 16 may initially re-enter the atmosphere at a so-called zero angle of attack (i.e., α=0°), in which the vehicle 16 is oriented such that the main body centerline 30 is parallel to the direction of travel 60. In this orientation, the heat shield centerline 32 is offset relative to the direction of travel 60 by an angle δ equal to the angle β at which the heat shield centerline 32 is offset relative to the main body centerline 30. In the zero angle of attack orientation, the center of gravity 62 and the center of pressure 64 of the vehicle 16 are in a plane 66 offset relative to the direction of travel 60. The fact that the centerbody base 46 of the heat shield 10 is axisymmetric about the heat shield centerline 32, which is offset at the angle β relative to the main body centerline 30, advantageously causes a net lift force on the vehicle 16 relative to the direction of travel 60, even at the zero angle of attack.

During operation of the vehicle 16 at a zero angle of attack (FIG. 8), the aerodynamic lift and drag forces on the vehicle 16 will generate pitching moments about the center of gravity 62, and the vehicle 16 will naturally adopt an orientation at which those moments are balanced (i.e., the aerodynamic trim point). This orientation, shown in FIG. 9, increases an angle α between the centerbody base 46 and the high enthalpy flow 68 that is moving relative to the vehicle 16 in a direction opposite the direction of travel 60. The non-zero angle of attack orientation (FIG. 9) therefore generates additional lift than the zero angle of attack orientation (FIG. 8). In the non-zero angle of attack (FIG. 9), the plane 66 of the center of gravity 62 and the center of pressure 64 will be parallel relative to the direction of travel 60, and opposing sides of the vehicle 16 will be at different respective angles φ1, φ2 relative to planes 70, 71 parallel to the direction of travel 60. The heat shield centerline 32 is offset relative to the direction of travel 60 by an angle δ equal to the sum of: (i) the angle α between the centerbody base 46 and the high enthalpy flow 68; and (ii) the angle β at which the heat shield centerline 32 is offset relative to the main body centerline 30. The angle of attack α should not exceed the sidewall angle θ. Thus, in the illustrated embodiment, the vehicle 16 should not be flown at an angle of attack α that exceeds 7°. Maintaining the angle of attack α below this threshold prevents the high enthalpy flow 68 from impinging on the sidewall 36 of the vehicle 16, eliminating the need for additional heat shielding (and the accompanying additional mass) on those surfaces the sidewall 36. The center of gravity 62 and the center of pressure 64 of the vehicle 16 can be selected to achieve a particular non-zero angle of attack during atmospheric re-entry.

The non-axisymmetric nature of the heat shield 10 (e.g., the oblique angle β of the centerbody base 46 relative to the main body centerline 30) allows the vehicle 16 to achieve a higher lift-to-drag ratio within a certain angle of attack constraint. That is, the vehicle 16 can achieve a certain target lift-to-drag ratio with a lower range of angles of attack α. This allows a shallower sidewall angle θ while still preventing hypersonic flow 68 from impinging on the sidewall 36 of the vehicle 16. This in turn allows for increased volume available for other system uses (e.g., propellant, payload, etc.).

To minimize the additional mass of the heat shield 10 and aerodynamic controls, the vehicle 16 exposes only the relatively small heat shield 10 of the vehicle 16 to the high enthalpy flow 68, while also generating a sufficient lift-to-drag ratio for precise maneuvering and landing. By adjusting both the angle β of the centerbody base 46 relative to the main body centerline 30, and the location of the center of gravity 62, the design of the vehicle 16 can be adjusted to produce different amounts of lift while maintaining the same trimmed angle of attack α. This adds freedom in the design space which is not available for traditional axisymmetric vehicle shapes. The combined surfaces of the heat shield 10 and nozzle 12 are advantageous in that they result in a lower mass penalty for the heat shield 10 in a reusable upper stage application.

While several embodiments have been disclosed, it will be apparent to those having ordinary skill in the art that aspects of the present invention include many more embodiments. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. An annular aerospike nozzle, comprising:
    a centerbody;
    a plurality of thrust chambers spaced around the centerbody, each thrust chamber including:
        a throat; and
        a nozzle portion extending aft of the throat, the nozzle portion having
    an exit dimension $D_{exit}$ at an aft end thereof;
    wherein each thrust chamber is spaced away from adjacent thrust chambers by a spacing distance $D_{space}$, such that $D_{space} \geq M*D_{exit}$, where $M \geq 1$.

2. The annular aerospike nozzle of claim 1, wherein the centerbody has a circular contour, and the plurality of thrust chambers are spaced around the circular contour of the centerbody.

3. The annular aerospike nozzle of claim 2, wherein the spacing distance $D_{space}$ is defined as an arc length between adjacent thrust chambers.

4. The annular aerospike nozzle of claim 2, wherein the spacing distance $D_{space}$ is defined as a chord length between adjacent thrust chambers.

5. The annular aerospike nozzle of claim 1, wherein the thrust chambers are uniformly spaced around the centerbody.

6. The annular aerospike nozzle of claim 1, wherein the exit dimension $D_{exit}$ of the nozzle portion of each thrust chamber is a diameter.

7. An engine, comprising:
    a centerbody;
    a plurality of thrust chambers spaced around the centerbody, each thrust chamber including:
        a high pressure chamber that generates a gas for thrust;
        a nozzle portion that extends aft of the high pressure chamber and exhausts the gas generated by the high pressure chamber;
        the nozzle portion having an exit dimension $D_{exit}$ at an aft end thereof; and
        a throat connecting the high pressure chamber to the nozzle portion;
    wherein each thrust chamber is spaced away from adjacent thrust chambers by a spacing distance $D_{space}$, such that $D_{space} \geq M*D_{exit}$, where $M \geq 1$.

8. A vehicle, comprising:
    an engine including a centerbody and a plurality of thrust chambers spaced around the centerbody, each thrust chamber including:
        a high pressure chamber that generates a gas for thrust,
        a nozzle portion that extends aft of the high pressure chamber and exhausts the gas generated by the high pressure chamber, the nozzle portion having an exit dimension $D_{exit}$ at an aft end, and
        a throat connecting the high pressure chamber to the nozzle portion;
    wherein each thrust chamber is spaced away from adjacent thrust chambers by a spacing distance $D_{space}$, such that $D_{space} \geq M*D_{exit}$, where $M \geq 1$.

9. The vehicle of claim 8, further comprising a thruster mount positioned at an aft end of a main body of the vehicle, the thruster mount having a plurality of openings extending therethrough in a direction parallel to a centerline of the main body of the vehicle, wherein each opening is configured to receive one of the thrust chambers.

10. The vehicle of claim 9, wherein the centerbody is non-axisymmetric relative to the centerline of the main body of the vehicle.

11. The vehicle of claim 9, wherein the centerbody and the thruster mount define at least a portion of a heat shield.

12. The vehicle of claim 8, wherein the centerbody has a circular contour, and the plurality of thrust chambers are spaced around the circular contour of the centerbody.

13. The vehicle of claim 12, wherein the spacing distance $D_{space}$ is defined as an arc length between adjacent thrust chambers.

14. The vehicle of claim 12, wherein the spacing distance $D_{space}$ is defined as a chord length between adjacent thrust chambers.

15. The vehicle of claim 8, wherein the thrust chambers are uniformly spaced around the centerbody.

16. The vehicle of claim 8, wherein the exit dimension $D_{exit}$ of the nozzle portion of each thrust chamber is a diameter.

17. The vehicle of claim 8, wherein the vehicle is an upper stage rocket.

* * * * *

UNITED STATES PATENT AND TRADEMARK OFFICE
CERTIFICATE OF CORRECTION

| | |
|---|---|
| PATENT NO. | : 12,152,553 B2 |
| APPLICATION NO. | : 18/554650 |
| DATED | : November 26, 2024 |
| INVENTOR(S) | : Thomas Ryan McCullough et al. |

Page 1 of 1

It is certified that error appears in the above-identified patent and that said Letters Patent is hereby corrected as shown below:

In the Specification

Column 11, Line 61, "y is the ratio" should be changed to -- $\gamma$ is the ratio --

Column 12, Line 1, "efficiency $\eta_F$" should be changed to -- efficiency $\eta_{CF}$ --

Signed and Sealed this
Seventh Day of January, 2025

Derrick Brent
*Acting Director of the United States Patent and Trademark Office*